No. 720,675. PATENTED FEB. 17, 1903.
J. L. CREVELING.
SYSTEM OF DISTRIBUTION.
APPLICATION FILED FEB. 12, 1902.
NO MODEL. 3 SHEETS—SHEET 1.
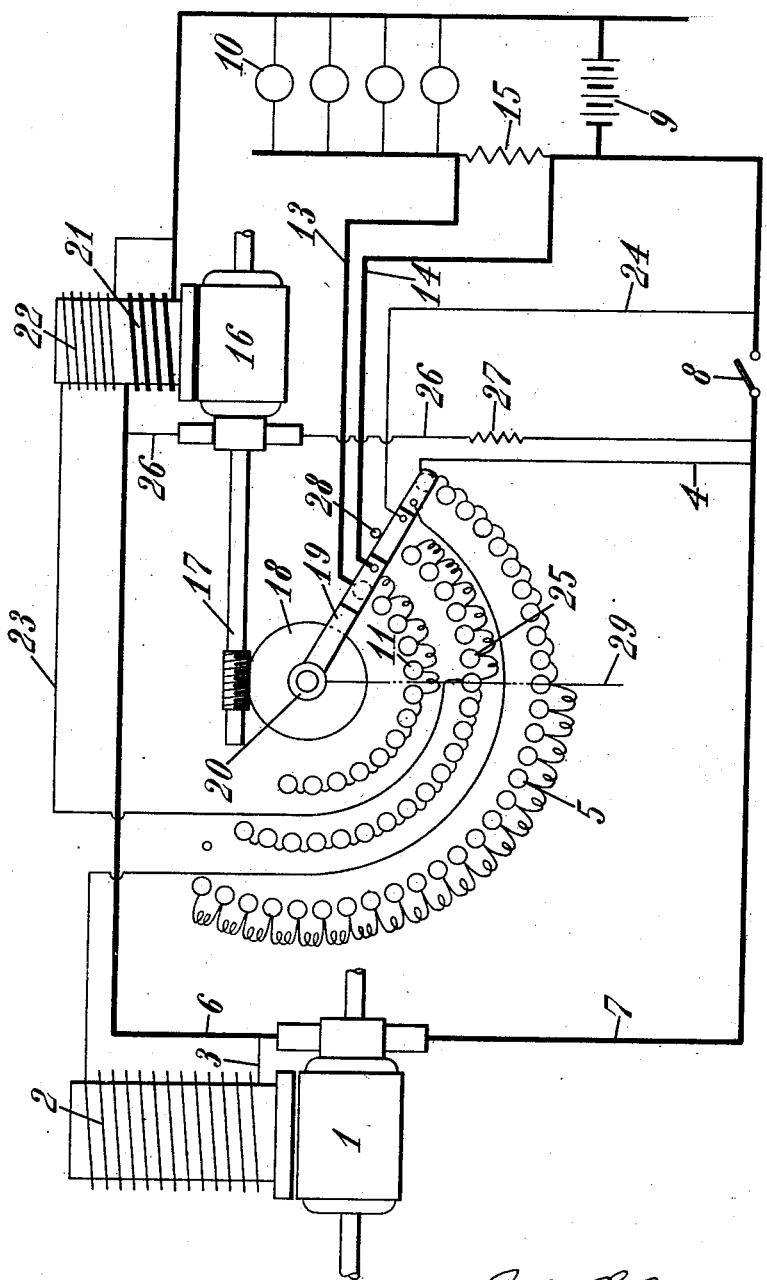
Fig. I.
WITNESSES:
E. J. Schroeder, Jr.
John L. Creveling
INVENTOR.
BY
ATTORNEYS No. 720,675. PATENTED FEB. 17, 1903.
J. L. CREVELING.
SYSTEM OF DISTRIBUTION.
APPLICATION FILED FEB. 12, 1902.
NO MODEL. 3 SHEETS—SHEET 2.
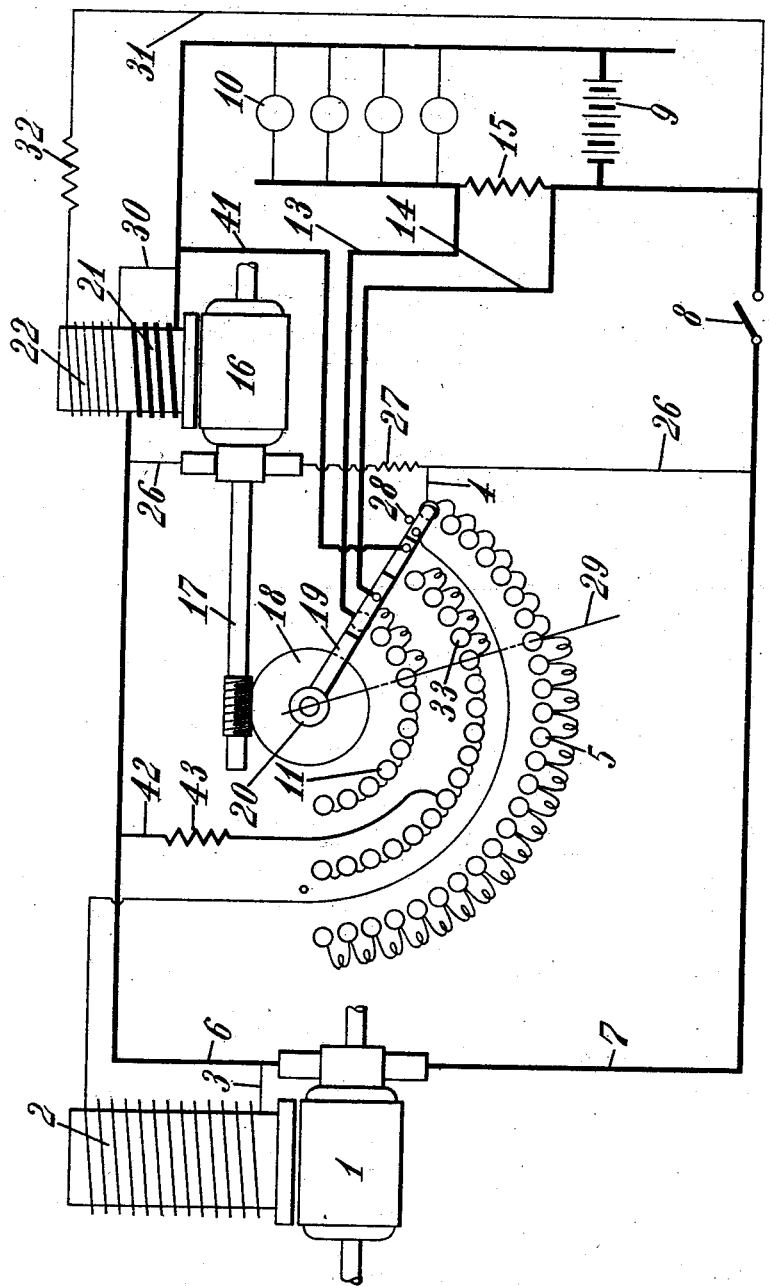
Fig. II.
WITNESSES: INVENTOR.
John L. Creveling
BY
His ATTORNEYS No. 720,675. PATENTED FEB. 17, 1903.
J. L. CREVELING.
SYSTEM OF DISTRIBUTION.
APPLICATION FILED FEB. 12, 1902.
NO MODEL. 3 SHEETS—SHEET 3.
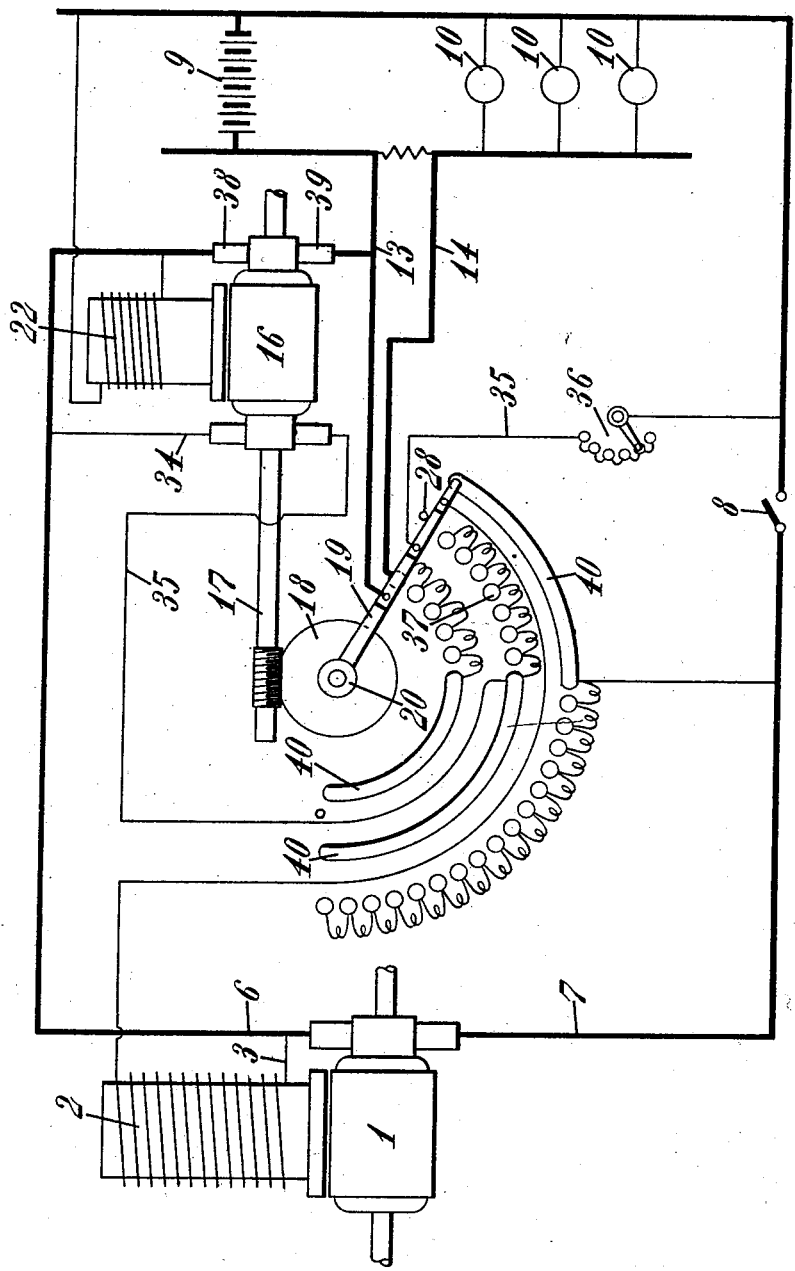
Fig. III.
WITNESSES:
E. J. Schroeder, Jr.
John L. Creveling
INVENTOR.
BY
ATTORNEYS.

UNITED STATES PATENT OFFICE.

JOHN L. CREVELING, OF NEW YORK, N. Y.

SYSTEM OF DISTRIBUTION.

SPECIFICATION forming part of Letters Patent No. 720,675, dated February 17, 1903.

Application filed February 12, 1902. Serial No. 93,774. (No model.)

*To all whom it may concern:*

Be it known that I, JOHN L. CREVELING, a citizen of the United States, residing in the borough of Manhattan, city, county, and State of New York, have invented certain new and useful Improvements in Systems of Distribution, of which the following is a specification.

My invention relates to systems of distribution, and has for its particular object to produce means for so controlling the output of a generator driven at variable speed that above a certain speed its current output shall remain practically constant regardless of the speed variations of the generator, and comprising also means for regulating the lamp-circuit in accordance with the rise in voltage across the generator-mains while the load is being raised from zero to its maximum amount.

In the accompanying drawings I have shown three modes of carrying out my invention. These drawings are diagrammatic merely and are shown by way of illustration and in order to give such a full, clear, and exact description of my invention as will enable those skilled in the art to make and use the same.

In the drawings, Figures I, II, and III represent different forms of my invention, the views being diagrammatic.

Referring for the present to Fig. I, 1 represents a generator having a field-winding 2 in shunt to the mains through the wires 3 4 and adapted to be controlled by a variable-resistance device 5, shown in series therewith. 6 7 represent the generator-mains, 8 a line-switch, 9 the batteries, and 10 suitable lamps or other translating devices. A variable resistance 11 is adapted to be inserted in the lamp-circuit through the medium of wires 13 14, which form part of the lamp-circuit and which are shunted by a resistance 15. 16 represents a small regulating-motor, whose shaft 17 is adapted to drive a gear 18, to which an arm 19 is connected by a frictional connection 20. The motor 16 has opposing field-coils, one of which—to wit, the coil 21—is in the generator-main circuit, and the other—to wit, the coil 22—is when active connected in shunt across the battery through the medium of the wires 23 24 and the variable resistance 25. The motor-armature is shown in the present instance as connected across the generator-mains by wires 26 through a suitable resistance 27. The operation of the construction embodying this form of my invention is as follows: When current is flowing through the armature 16 and winding 22, the normal tendency of the field-winding 22 of the small motor is to cause the motor to bring the arm 19 against the stop 28. When in this position, the generator is receiving full field and the resistance 15 is short-circuited, the lamp-circuit being fed from the battery. When the generator starts up and reaches its proper speed and the voltage has risen to the proper degree, the line-switch 8 closes, as is well understood, and the generator commences to deliver current to the line. When this occurs, the generator-current passes through the winding 21 of the regulator-motor, and as soon as this winding receives an appreciable current the motor rotates and moves the switch-arm 19 to the left. The effect of this movement is twofold—first, resistance is inserted in the lamp-circuit to compensate for the rise in voltage across the mains, and, second, the coil 22 is connected in the circuit through the variable resistance 25, which resistance determines the current necessary in coil 21 to cause the motor to operate to vary the lamp resistance. As the speed of the generator increases this movement will continue until a certain normal position has been reached by the lever, which position is indicated by the dotted line 29, the generator still receiving full field and the lamp-circuit having resistance therein. Now when this normal position has been reached the regulation of the generator, so as to give a practically constant output, begins, the contacts of the field-rheostat having up to this point been connected by the short wires, merely inserting a small resistance, so as to prevent too rapid increase of current for a slight change of speed, it being remembered that the external circuit of the generator, owing to the battery, is of very low resistance. A slight rise in the output of the machine will now cause the winding 21 to overpower the winding 22 and cause the motor to rotate in such a direction as to insert resistance 5 into the field-circuit to thereby cut down the output, thus holding the same practically constant. It is to be noted, however, that after the switch-arm passes the normal line 29 the winding 22 and the lamp-circuit no longer have their resistances very appreciably altered by further movement, as the contacts of the variable resistance 11 and 25 are connected by the short wires beyond the line 29.

In Fig. II, I have shown a construction somewhat similar to Fig. I. In this figure, however, the coil 22 is shown as connected in shunt to the batteries by the wires 30 31 and an interposed resistance 32, and instead of varying the resistance in circuit with the coil 22 the said coil 22 is kept constant and the coil 21 is strengthened or weakened, in accordance with the output of the machine, by the variable resistance 33 in shunt thereto through wires 41 and 42 and resistance 43. The operation of this form of construction will be obvious from the foregoing description of Fig. I.

In Fig. III, I have shown a similar construction, in which the winding 22 is in circuit with the battery and the armature of the regulator-motor is provided with opposed windings, one winding in shunt to the batteries through the wires 34 and 35 and the interposed resistance 36 and resistance device 37, the other winding of the armature being connected in series with the mains by the brushes 38 39. Instead of employing a series of short-circuited contacts I have shown in the present instance plates 40, which may be used, if desired.

Having described my invention, what I claim, and desire to secure by Letters Patent, is—

1. In a system of distribution the combination with a generator and a lamp or consumption circuit of a motor device controlling the output of the generator comprehending a member having a magnetic flux which is a function of the current generated and a member whose flux coöperates with the above to produce motion, and means under control of the said motor device regulating the lamp or consumption circuit.

2. In a system of distribution the combination with a generator and a lamp or translating circuit, a motor device controlled by the output of the generator comprehending an independent magnetic flux coöperating with a flux which is dependent upon the generator output to produce motion and means varying the generator-field and the lamp-circuit substantially as set forth.

3. In a system of distribution the combination with a generator, controlling means in its field-circuit, a motor device therefor, means operating said motor device by a differential magnetic field under the direct control of the output of the generator and a lamp-circuit including a regulating device under the control of the said motor device.

4. In a system of distribution the combination of a generator a regulator-motor having a plurality of windings and governed by variations of the output of the generator, a generator-governing device under control of the regulator-motor, a consumption-circuit-regulating device under control of the regulator-motor and means under control of said motor-regulating current in one of its windings upon change in current in another of its windings.

5. In a system of distribution as a means regulating a variable-speed generator to maintain its current output constant above a certain speed and to regulate a lamp-circuit in accordance with the rise in voltage during acquirement of this speed, the combination of a generator-regulating means, a consumption-circuit-regulating means and a motor device operating the said means and means operated by the variation in the output of the generator producing motion in the motor device and varying one of the magnetic fields of the said motor device.

6. The combination of a generator and its field-circuit and a regulator comprising a motor whose rotation governs said field-circuit, said motor being provided with a plurality of windings, one of which is traversed by a suitable predetermined current and another of which is traversed by the current to be regulated, means whereby the resultant magnetomotive force of said windings determines the operation of the regulator-motor, and means under the control of the regulator-motor regulating the consumption-circuit.

7. The combination with a dynamo and a lamp or consumption circuit, means regulating the dynamo comprehending an electric regulator-motor comprising a plurality of windings, means whereby two of the windings traversed by currents determine the normal generator-load, and means whereby one of the windings is traversed by the current to be regulated and maintains said load, and means under the control of the regulator regulating the lamp or consumption circuit.

8. In a system of distribution the combination of a generator, a translating-circuit and suitable translating devices of an automatic regulator for the generator, comprehending means whereby the current from the generator opposes the action of current in a coil determining the normal output of the generator, and means under the control of the regulator-motor regulating the translating circuit and current in the opposing windings.

9. A system of distribution comprising a generator, a regulator-motor therefor, controlling the field of the generator and having two windings, means whereby said windings tend to operate the regulator-motor to increase the output of the generator, and a third winding in circuit with the generator, and means whereby said winding tends to decrease the output, and means under the control of the regulator-motor for regulating the consumption-circuit.

10. A system of distribution comprising a generator, an external circuit and a regulator-motor controlling the output of the generator and having a plurality of windings, the magnetomotive force of one of the said windings being a function of the current generated and a rotating member, means tending to rotate said member to cause a magnetic balance to be set up or preserved between two of the windings, and means under the control of the regulator-motor regulating the consumption-circuit.

11. A system of electrical distribution including a generator, an external circuit and a regulator-motor controlling the output of the generator, said regulator-motor having windings, the magnetomotive force of one of the said windings being a function of the current to be generated and means normally tending to set up a magnetic balance between said windings, and means unbalancing the windings by a change in output, and means under the control of the regulator-motor regulating the consumption-circuit.

12. In a system of distribution the combination of a generator, a rotary regulator-motor, having windings one of which is in the generator-circuit and means whereby the regulator-motor, by its rotation, varies the output of the generator and current in another of its own circuits.

13. In a system of electrical distribution the combination of a generator, an external circuit and a regulator-motor having opposing windings, one of said windings tending to create a magnetomotive force which is a function of the current generated, means whereby a magnetic balance between the said windings of the motor is maintained by the rise of magnetomotive force in one of its windings in harmony with the rise of output of the generator.

14. In a system of electrical distribution the combination of a generator and a regulator-motor having opposing windings, one of which windings tends to create a magnetomotive force which is a function of the current generated, means whereby magnetic balance of the opposing windings of the motor is maintained through a rise of magnetomotive force in one of its windings in harmony with the rise in the output of the generator, and means whereby the said regulator-motor inserts resistance in a translating-circuit.

15. A system of distribution comprising a generator and a regulator-motor governing the output of the generator and having a plurality of windings, means whereby the magnetomotive forces of two of said windings tend to cause the motor to increase the output of the generator and a winding in circuit with the generator, and means whereby the magnetomotive force of this winding by opposing one of the above-named magnetomotive forces tends to cause the motor to decrease the output, and means whereby an increase or diminution of current in one of the said opposed windings causes the movable member to move in certain positions to cause an increase or diminution in the other opposed winding.

16. In a system of electrical distribution the combination of a generator, a storage battery and a work or translating circuit, a regulator governing the generator and the translating-circuit comprising a plurality of opposed windings, and means whereby a winding whose magnetic flux acts upon the resultant flux of the opposed windings to increase or diminish the generator output and to regulate the translating-circuit to compensate for changes in speed of the generator, and means whereby, throughout certain predetermined ranges in the generator output, one of the opposing coils has its current increased or diminished in harmony with increase or decrease of current in the other coil.

17. In a system of distribution means regulating a generator and the consumption-circuit, comprehending means creating an independently-determined magnetomotive force, means creating an opposing magnetomotive force which is a function of the current generated and thus producing a resultant magnetic field whose polarity is dependent upon the current generated, means exposed to the influence of the above-named resultant magnetic field tending to set up an independent magnetic field, producing motion in a positive or negative direction dependent upon the polarity of the resultant magnetic field and means whereby said motion in one direction increases the output of the generator and in the other direction decreases the said output and means operated by said motor regulating the consumption-circuit.

18. In a system of distribution means regulating a dynamo or generator and the consumption-circuit, comprehending means setting up a resultant magnetic field by a difference in effect between a magnetomotive force which is a function of the current generated and an independently-determined magnetomotive force and means whereby the action of another magnetomotive force exerting its influence upon the magnetic field causes a rotary member to so rotate as to affect the regulation of the generator and means operated by said rotary member regulating the consumption-circuit.

19. Means regulating a generator and its consumption-circuit, comprehending means creating a resultant magnetic field, the strength and direction of which are determined by the action of a magnetomotive force which is a function of the current generated and a predetermined magnetomotive force and means acting upon the said magnetic field with another magnetic field and means whereby the action of the last-named field and the resultant magnetic field produces mechanical motion and means whereby such motion affects the regulation of the output of the generator and regulates the consumption-circuit.

20. Means regulating a generator or dynamo and its lamp or consumption-circuit, comprehending means creating a resultant magnetic field by the combined effect of a magnetomotive force which is a function of the current generated and an independent magnetomotive force, means whereby a resultant flux acting upon another magnetomotive force produces mechanical motion and means whereby such mechanical motion regulates the output of the generator and the consumption-circuit.

21. Means regulating the output of the generator and its consumption-circuit, which comprehends means producing mechanical motion by the combined action of the flux which is the resultant effect of a magnetomotive force which is a function of the current generated and an independent magnetomotive force and another flux and means whereby such mechanical motion governs the generator and consumption-circuit.

JOHN L. CREVELING.

Witnesses:
F. E. KESSINGER,
GEO. E. MORSE.